US007515301B2

(12) United States Patent
Gembe

(10) Patent No.: US 7,515,301 B2
(45) Date of Patent: Apr. 7, 2009

(54) VISUAL CONTROL DEVICE FOR EXPOSED PRINTING PLATES

(75) Inventor: Andreas Gembe, Leimen-Gauangelloch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 723 days.

(21) Appl. No.: 11/083,654

(22) Filed: Mar. 18, 2005

(65) Prior Publication Data

US 2005/0206932 A1 Sep. 22, 2005

(30) Foreign Application Priority Data

Mar. 18, 2004 (DE) ...................... 10 2004 013 290

(51) Int. Cl.
*G06K 1/00* (2006.01)
*G06F 15/00* (2006.01)
*H04N 1/60* (2006.01)
*H04N 1/40* (2006.01)

(52) U.S. Cl. ...................................... 358/1.9; 358/3.06

(58) Field of Classification Search ......... 358/296–305, 358/1.9–3.32
See application file for complete search history.

(56) References Cited

U.S. PATENT DOCUMENTS

| | | | | |
|---|---|---|---|---|
| 5,748,331 | A | 5/1998 | Köhler | |
| 6,128,090 | A * | 10/2000 | hunsel et al. | 356/402 |
| 2003/0144815 | A1 | 7/2003 | Kohler | |

FOREIGN PATENT DOCUMENTS

| | | |
|---|---|---|
| EP | 1 006 712 A1 | 6/2000 |
| EP | 0 847 858 B1 | 7/2002 |

* cited by examiner

*Primary Examiner*—Douglas Q Tran
(74) *Attorney, Agent, or Firm*—Laurence A. Greenberg; Werner H. Stemer; Ralph E. Locher

(57) ABSTRACT

A visual control device in the form of at least one control marking is provided on an exposed printing plate for a printing press, the visual control device being applied during exposure of the printing plate. The control marking includes at least two strips extending at least approximately in parallel, one of the strips depicting an uncalibrated tonal value profile around a defined halftone value, while another of the strips depicts the defined halftone value calibrated in the printing process. The control marking is provided with at least one region wherein the uncalibrated tonal value profile and the calibrated defined halftone value coincide visually in terms of color; and a printing plate provided with at least one of the control devices.

10 Claims, 4 Drawing Sheets

VISUAL CONTROL DEVICE FOR EXPOSED PRINTING PLATES

BACKGROUND OF THE INVENTION

Field of the Invention

The invention of the instant application relates to a visual control device on exposed printing plates for printing presses, the visual control device being applied in the form of at least one control marking to the printing plate during exposure of the printing plate.

The printing process is subdivided in principle into a pre-press stage, a press stage and a post-press processing or print finishing stage. It is the aim of every printing process to produce printed products which correspond as exactly as possible to a printing original. The printing original can be present in the physical form of a printed specimen, but it can also be present digitally as an image file. A printing original as an image data file is prepared digitally for printing at the prepress stage by a raster image processor, with the result that the data present after that process are suitable for exposing a printing plate for offset printing presses. In addition to the actual printing image, various markings and control regions are also applied to the printing plate in the edge regions of the printing plate and include, for example, tonal value wedges on printing plates in nonprinting regions and print control strips and register marks in printing regions. In every printing process, the printing personnel have to ensure that the finished printed product also corresponds to the original. If discrepancies occur, the printing process has to be corrected, i.e., the settings in the prepress stage and/or in the press stage have to be changed. If the printing quality of the finished printed product is inadequate, this printed product must be discarded as waste, which is undesirable due to the additional costs. For this reason, the operating personnel in printing works would also like to be able to detect any process discrepancies from the intended settings as early as possible in the complete printing process. Such process discrepancies can occur as early as the processing of the data of the printing original in the prepress stage, for which reason printing plates are provided with control devices in the form of tonal value wedges. A control device of the type shown in FIG. 1 is generally known from the prior art, the specimen tonal values being shown here in a first elongated strip in a fixed screen ruling of, for example, 200 lines/inch offset obliquely at an angle of 45° with regard to the leading edge of the printing plate in a range from 1 to 100%, while the tonal values after the process calibration in the RIP (raster image processor) of the prepress stage are applied in a second strip extending parallel to the first strip. The specimen tonal values are not influenced by the RIP and represent a reference. From the respectively appertaining tonal values for prescribed percentage values, which are arranged above one another, a comparison is possible for the printing personnel by visual inspection, and the discrepancies can be roughly estimated quantitatively within the context of the scale which is provided with percentage values.

In particular, for the digital exposure of printing plates (CtP), i.e., computer to plate, it is, however, enormously important in the prepress stage for the discrepancies to be within narrow tolerance ranges. In the conventional control devices, such as in the case of a control wedge in FIG. 1, it is only possible to check the differences visually between uninfluenced and influenced settings. A comparison of the specimen tonal values and so-called linearized tonal values which are used in some exposure procedures is thus missing. It is likewise not possible to visually detect quantitatively the difference in the discrepancy at the important 50% tonal value between the uncalibrated and the calibrated state.

SUMMARY OF THE INVENTION

It is accordingly an object of the invention to provide a visual control device on exposed printing plates which permits an improved visual quantitative estimation of the differences in the result of the exposure process.

With the foregoing and other objects in view, there is provided, in accordance with one aspect of the invention, a visual control device on an exposed printing plate for a printing press. The visual control device contains at least one control marking provided on the printing plate. The control marking is applied thereto during exposure of the printing plate and contains at least two strips extending at least approximately in parallel, one of the strips exhibiting an uncalibrated tonal value profile around a defined halftone value, and another of the strips exhibiting a defined halftone value calibrated in the printing process. The at least one control marking has displayed thereon at least a region wherein the uncalibrated tonal value profile and calibrated defined halftone value coincide visually in terms of color.

In accordance with another feature of the invention, the tonal values of the uncalibrated tonal value profile stepwise increase and decrease, respectively.

In accordance with a further feature of the invention, the defined halftone value is a 50% tonal value.

In accordance with an added feature of the invention, the visual control device further has a display scale with associated percentage values provided on the control marking parallel to the two strips.

In accordance with an additional feature of the invention, the display scale extends from minus 15% to plus 3%.

In accordance with another aspect of the invention, there is provided a visual control device on an exposed printing plate for a printing press. The visual control device contains at least one control marking on the printing plate. The control marking is applied during exposure of the printing plate and has reference tonal values non-influencable by the printing process stepwise increasing and decreasing, respectively, in an elongated strip. A defined halftone value is depicted repeatedly in high resolution within the same strip. The defined halftone value being delimited within the same strip, respectively, by polygons.

In accordance with yet another feature of the invention, the polygons are at least approximately enclosed by a diamond form.

In accordance with yet a further feature of the invention, the polygons have right-angled corners.

In accordance with yet an added feature of the invention, the visual control device further includes a process discrepancy scale having numerically specified tonal-value changes parallel to the strips.

In accordance with yet an additional feature of the invention, the scale has numerically specified process discrepancies extending from minus 5 to plus 5.

In accordance with a further aspect of the invention, there is provided a visual control device on an exposed printing plate for a printing press. The visual control device contains at least one control marking provided on the printing plate. The control marking is applied thereon during exposure of the printing plate and contains at least a first elongated strip having an entire tonal value profile applied thereto as reference values. At least a second elongated strip having an entire calibrated tonal value profile is further applied thereto. The second strip extends at least approximately parallel to the first strip. At least a third elongated strip having a linearized tonal value profile is applied thereto. The third strip extends at least approximately parallel to the parallel first and second strips.

In accordance with still another feature of the invention, the visual control device further includes a tonal value scale applied parallel to the elongated strips.

In accordance with yet another aspect of the invention, there is provided an exposed printing plate having thereon at least one visual control device. The control device contains at least one control marking provided on the printing plate. The control marking is applied thereon during exposure of the printing plate and contains at least a first elongated strip having an entire tonal value profile applied thereto as reference values. At least a second elongated strip having an entire calibrated tonal value profile is applied thereto, the second strip extends at least approximately parallel to the first strip. At least a third elongated strip having a linearized tonal value profile is applied thereto, the third strip extending at least approximately parallel to the parallel first and second strips.

In accordance with a concomitant aspect of the invention, there is provided an exposed printing plate having thereon at least two different control devices. The control devices are selected from a first, second and/or third control device. The first control device contains at least one control marking provided on the printing plate. The first control marking being applied thereto during exposure of the printing plate and contains at least two strips extending at least approximately in parallel, one of the strips exhibiting an uncalibrated tonal value profile around a defined halftone value, and another of the strips exhibiting a defined halftone value calibrated in the printing process. The at least one first control marking has displayed thereon at least a region wherein the uncalibrated tonal value profile and the calibrated defined halftone value coincide visually in terms of color. The second control device contains at least one control marking on the printing plate. The second control marking is applied during exposure of the printing plate and contains reference tonal values non-influencable by the printing process stepwise increasing and decreasing, respectively, in an elongated strip. A defined halftone value is depicted repeatedly in high resolution within the same strip. The defined halftone value is delimited within the same strip, respectively, by polygons. The third control device contains at least one third control marking provided on the printing plate. The third control marking is applied thereon during exposure of the printing plate and contains at least a first elongated strip having an entire tonal value profile applied thereto as reference values and at least a second elongated strip having an entire calibrated tonal value profile applied thereto. The second strip extends at least approximately parallel to the first strip. At least a third elongated strip has a linearized tonal value profile applied thereto, and the third strip extends at least approximately parallel to the parallel first and second strips.

In accordance with yet a further aspect of the invention, there is provided a printing plate having thereon at least two different control devices containing the herein described features.

Thus, during the exposure of a printing plate at the prepress stage, a control marking is also applied to the printing plate, in particular in a nonprinting region, in addition to the printing image, the control marking including two at least approximately parallel extending strips. One of the strips represents an uncalibrated tonal value profile around a defined halftone value on an enlarged scale, i.e., the tonal values of this strip are in an uninfluenced state, while the second strip indicates the defined halftone value which has been changed by the calibration in the RIP (raster-image processor). In this regard, the control marking exhibits a detail from the uncalibrated tonal value profile in FIG. 1 of the prior art in the first strip, with highly stepped or staggered resolution, it being intended that the detail be selected so that an overlapping region of the two strips is visible. By the overlap there is meant the tonal value at which the parallel strips show the same tonal value optically, i.e., the continuous tonal value of the second strip equals a tonal value step of the first strip. In this regard, the strips are preferably shown in a gray value representation, which means in the case of overlapping that the tonal values which lie above one another exhibit a like gray value. If the overlapping value is not exactly under the zero marking, there is thus a discrepancy in the exposure between the uninfluenced reference values and the values which have been calibrated during manufacture of the printing plate. If this discrepancy does not coincide with the discrepancy which is set or desired by the personnel, the exposure process must be changed. Primarily, the great advantage of visual assessment on the printing plate is that there is no need for waste to be produced in the printing press, but rather, that undesirable discrepancies can be detected beforehand on the printing plate, and the printing plate can, if necessary or desirable, be exchanged for an improved printing plate before the printing operation in the printing press is started.

In a first embodiment of the invention, provision is made for the tonal values of the uncalibrated tonal value profile to increase or decrease in steps. In order to permit the printing personnel to make an exact assessment, the tonal value profile is stepped, because even very small discrepancies are then readily visible in the comparison of the uncalibrated tonal value profile and the overlapping value can thus be reliably detected visually in a relatively small region with small discrepancies. In this regard, the steps are selected so that they are adequately fine but not too fine, with the result that they are still recognizable optically but, however, also show minor discrepancies which are no longer tolerable.

Furthermore, provision is made for the defined halftone value to be the 50% tonal value. In the visual assessment of printed products, the 50% halftone value plays a large role, because the greatest dynamics occur in the manufacturing process of printing plates and in the entire printing process at this halftone value. For this reason, it is particularly important for the printing personnel to be able to detect discrepancies in the region of the 50% tonal value. Therefore, the control device depicts the region around the 50% tonal value on an increased scale, so that the printing personnel can assess this accurately.

Furthermore, provision is made for a display scale with associated percentage values on the control marking parallel to the two strips. The depicted percentage values parallel to the strips make it possible to quantitatively assess the difference between the tonal values in a purely visual manner. If, for example, the overlapping point with identical tonal values is located at minus 7%, what is meant thereby is that, for a halftone value of 50%, a reduction to 43% has been performed by the process calibration in the prepress stage. The operating personnel can use this read-off value to check the manufacturing process of the printing plate as to whether the settings have been implemented correctly. If the settings should result in a reduction of the halftone value from 50% to 43%, the manufacturing process has then been set optimally for this halftone value. If, however, the reduction in this example should be less than or more than 7%, for example only 6%, the personnel can recognize on the printing plate that the manufacturing process still has to be improved, because the desired settings have not been attained. Because the differences usually lie in the negative range, it is advantageous for the display scale to extend from minus 15% to plus 3%. The overlapping value can normally always be detected by using such a scale. If it should not be possible, however, to detect this tonal value equality of the overlapping value, the tonal value change correspondingly is then greater than 3% or smaller than minus 15% and therefore lies outside the display range of the control element.

In an alternative or additional embodiment of the invention, provision is made for reference tonal values non-influencable by the printing process to increase or decrease stepwise in an elongated strip, for a defined halftone value to be depicted in high resolution several times within the same strip, and for the defined halftone value to be delimited within the same strip, respectively, by polygons. This type of illustration of a control device is also always based upon a defined halftone value such as the 50% tonal value. With this control device, the operating personnel searches the region of the control device wherein the non-influenceable reference tonal values of the background in the strip and the constant high-resolution halftone values of the polygons located therein coincide. Due to the polygonal form, it is also yet possible to visually assess small discrepancies in the tonal values. In this regard, an optimum manufacturing process is attained when the tonal value of the polygons and the tonal value of the background of the elongated strip in the zero section of the control marking coincide. In the event of a discrepancy by one field towards the left-hand or the right-hand side, a discrepancy is produced which can be read off accordingly, depending upon the reference grid and the defined halftone value. If tonal value equality is established in the zero section, it may be concluded that the exposure energy and the chemical development process in the manufacture of the printing plates have been set correctly.

Additionally, provision is made for the polygons to be enclosed essentially by a diamond shape. The polygons can also have right-angled corners. These two constructions of the polygons have proven particularly suitable in practice for the detection and differentiation of even small changes between the two tonal values. Due to the diamond shape and the right-angled corners, it is also yet possible to detect very small discrepancies purely visually, and the overlapping point of tonal value equality on the control marking can thus be detected reliably.

It proves to be advantageous, furthermore, if a tonal value scale with numerically specified tonal value changes is disposed parallel to the strips. This tonal value scale permits a quantitative assessment of the discrepancy of the two tonal value profiles relative to one another. In practice, the numerically specified tonal value changes run from minus 5 to plus 5. This is an adequately large range which contains the tonal value equality at the overlapping point.

In a further alternative or additional embodiment of the invention, a visual control device is provided on exposed printing plates for printing presses, wherein the entire tonal value profile is depicted as reference values in at least one first elongated strip, the entire tonal value profile is depicted in a calibrated manner in at least one second strip running at least approximately parallel to the first strip, and a linearized tonal value profile is depicted in at least one third elongated strip which extends at least approximately parallel to the other strips. In addition to the comparisons of uninfluenced and uncalibrated reference values already known from the prior art according to FIG. 1 and exposure with process calibration, this embodiment of the invention additionally depicts a linearized tonal value profile over the entire tonal value range from 1 to 100%. Because the basic exposure is linearized in some of the printing plates during the exposure of the printing plates at the prepress stage, a control marking of this type also permits the comparison of basic exposure, linearization and process calibration, the process calibration also including the linearization. In this regard, a tonal value scale is depicted parallel to the three tonal value profiles, the tonal value scale specifying the tonal values in percent and being spread or stretched, respectively, at the ends. This is necessary, because the resolution for detecting differences has to be greater in the edge regions, i.e., for 1 and 100%.

Particularly advantageous embodiments of the invention result from the fact that a printing plate has several or all of the control markings according to the invention. In this case, the process for manufacturing printing plates can be checked comprehensively visually by the operating personnel.

Other features which are considered as characteristic for the invention are set forth in the appended claims.

Although the invention is illustrated and described herein as embodied in a visual control device for exposed printing plates, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
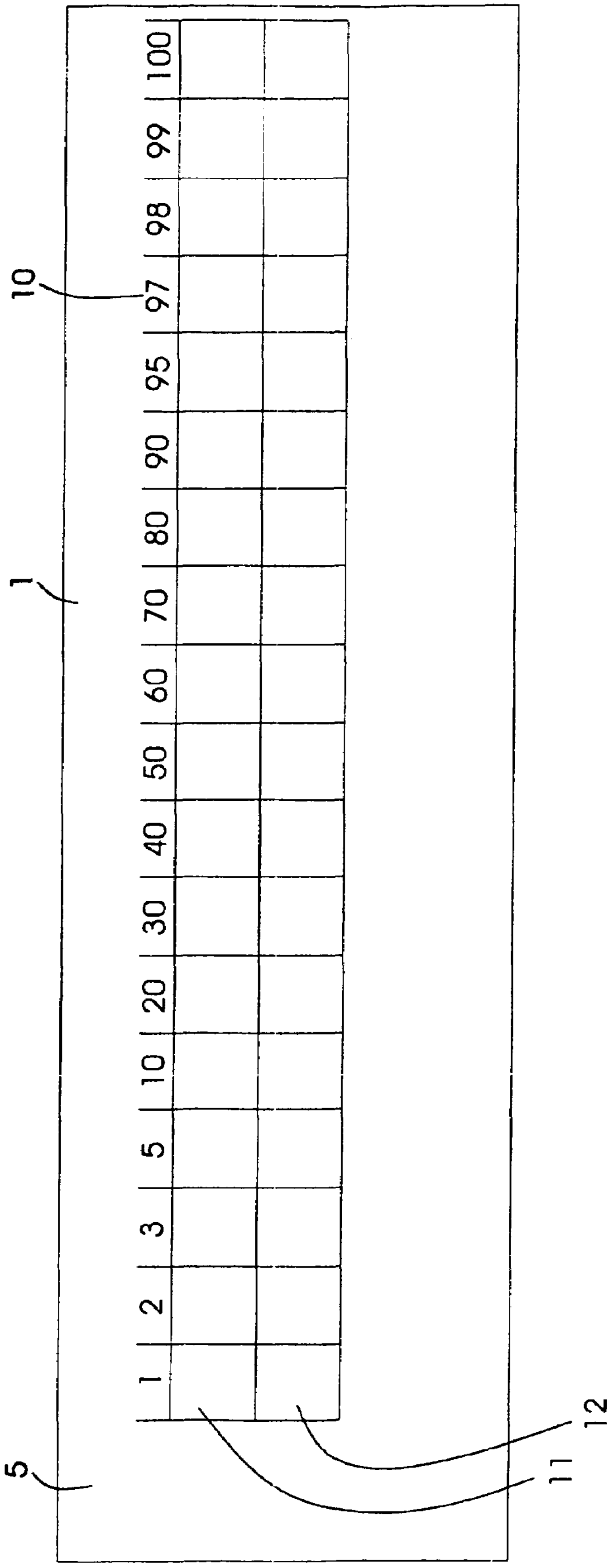
FIG. 1 Prior Art
FIG. 1 is a highly diagrammatic view of a control device according to the prior art.

Referring now to the drawings and, first, particularly to FIG. 1 thereof, there is shown therein a conventional control marking 1 which may be seen on a printing plate 5 after the latter has been exposed at a prepress stage. The control marking 1 is also referred to as a tonal wedge and serves for checking or controlling the process calibration at the prepress stage over the entire tonal profile from 1 to 100%. The tonal values are shown in gray stages for this purpose, an upper strip 11 illustrating the reference tonal values uninfluenced by prepress processes, while the lower strip which extends parallel to the upper strip 11 shows calibrated tonal values 12. In the upper region, furthermore, a tonal scale 10 is presented which indicates the tonal values in percentages. In this regard, the tonal values are represented in 10% steps in a range from 10% to 90%, while the values in a range from 1% to 10% and the values in a range from 90% to 100% are spread or stretched out, so that smaller optical differences therein are nevertheless made visually detectable.

Figure 2:
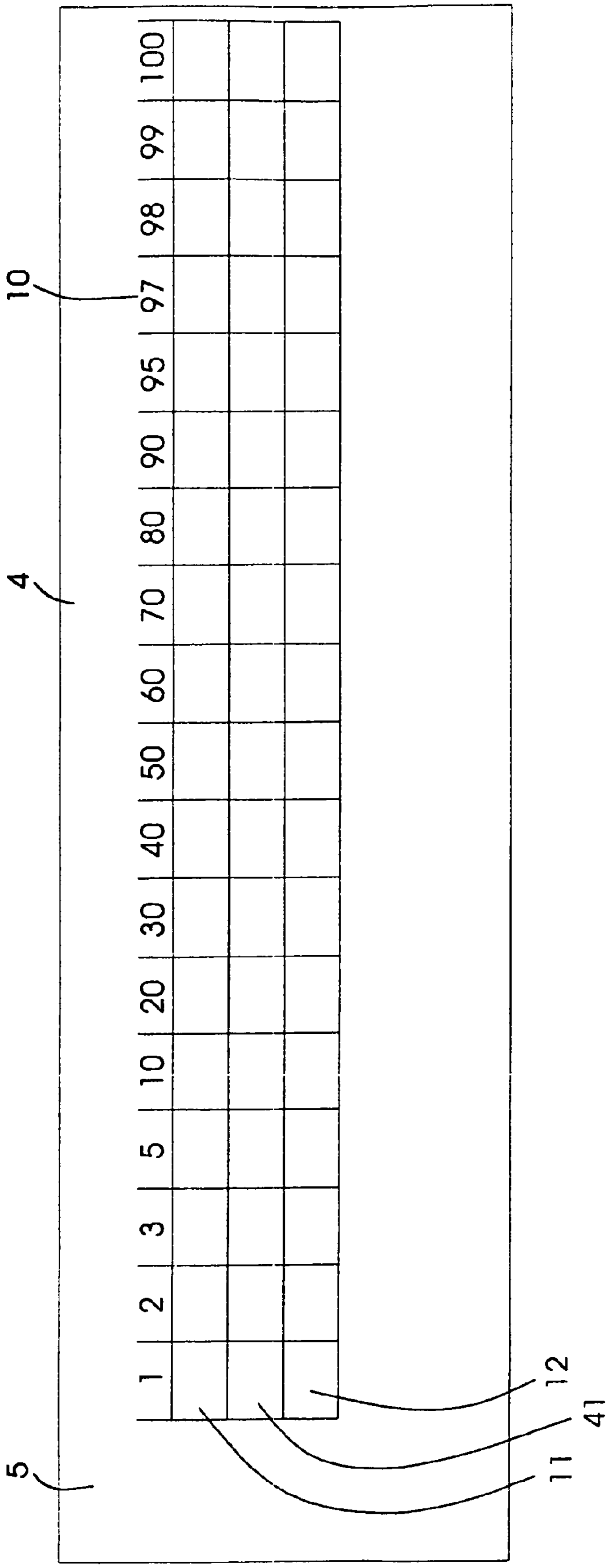
FIG. 2 is a diagrammatic view of a control device having an additionally visualized, linearized tonal graduation.

FIG. 2 shows a modified control marking 4 which differs from the control marking 1 in FIG. 1 by having an additional strip 41 with linearized tonal values. Here too, the tonal value scale 10 runs from 1 to 100%, which makes it possible not only to detect changes produced by the process calibration of the prepress stage in comparison with the reference tonal values 11, but also to detect additional changes in the linearized region visually by a comparison of linearized tonal values 41 and reference tonal values 11. As linearization of this type is performed in some printing plates during exposure, it is necessary in this case for it to also be possible to assess these linearized tonal values 41 in comparison with the specimen values 11, which the control marking 1 in FIG. 1 does not permit.

Figure 3:
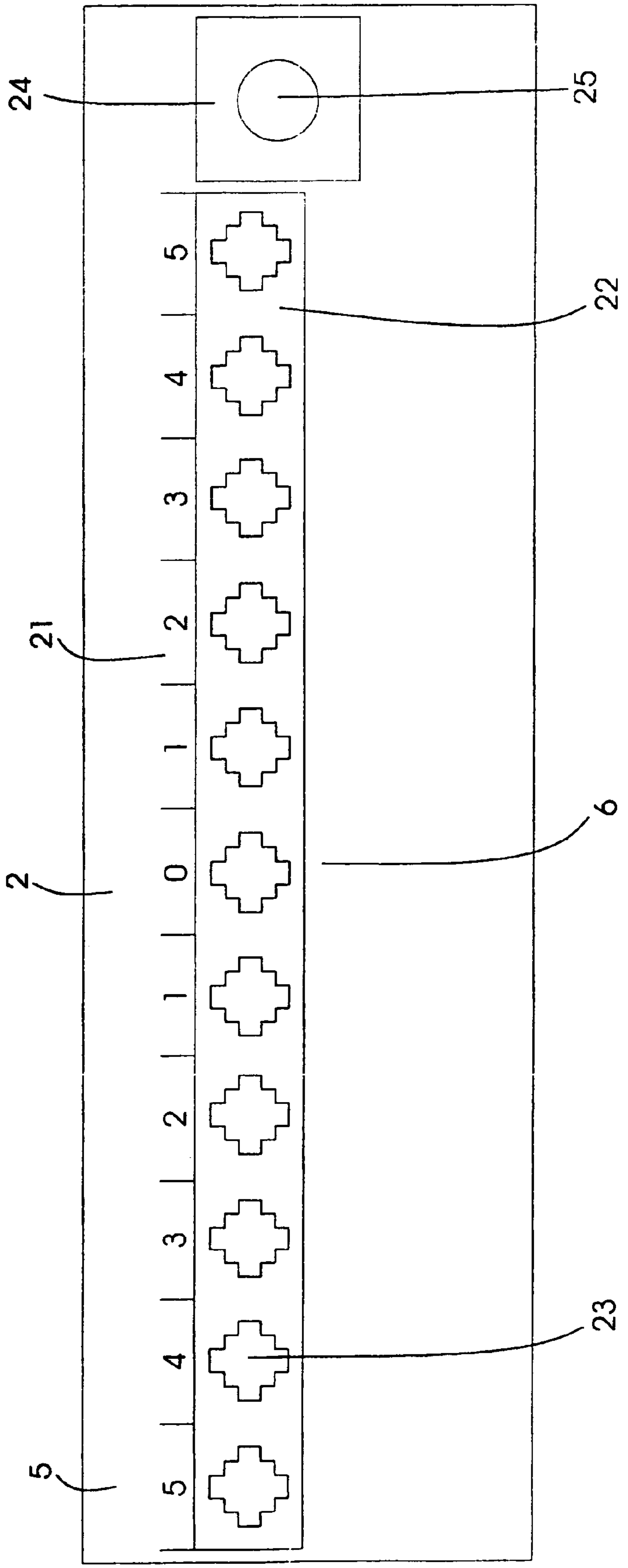
FIG. 3 is a diagrammatic view of the control device for assessing or evaluating the exposure energy and the chemical developing process with respect to a given halftone value.

With the high-resolution control marking 2 in FIG. 3, it is additionally possible to be able to visually assess quality and consistency during the manufacture of printing plates in the prepress stage, even for low tolerances. For this purpose, noninfluenceable reference tonal values 22 from the specimen are shown as gray stages in an elongated strip, geometrically delimited surfaces of a high-resolution defined halftone value 23 which cover the noninfluenceable reference tonal values 22 at these locations being situated within these noninfluenceable reference tonal values 22. While the noninfluenceable reference tonal values 22 increase from the left-hand to the right-hand sides of the figure, the high-resolution defined halftone value 23 remains constant. The high-resolution defined halftone value 23 has a screening of 30 μm×30 μm. In FIG. 3, the control marking 2 for a 50% halftone value is illustrated, a discrepancy upwardly and downwardly of plus/minus 5 being shown, which, for a reference screen of 80 lines/centimeter, represents a discrepancy of approximately 0.7% of a 50% halftone value per stage. Through the intermediary of the control marking 3, the influence of the exposure energy and of the chemical development, i.e., the overall effect of the manufacturing process and the thereby resulting deviation of the high-resolution defined halftone value 23 from noninfluenceable reference tonal values 22 in a narrow tolerance range, can be quantitatively assessed purely visually. Tonal value equality prevails in the region wherein a difference can no longer be detected visually between a gray stage of the noninfluenceable reference tonal values 22 and the high-resolution defined halftone value 23. Ideally, this field should lie at the zero value of the tonal value scale 21, because, in this case, an optimum manufacturing process is maintained in the prepress stage. The black borders of the polygonal areas in FIG. 3 do not exist in practice; they have been incorporated into the drawing only for reasons of improved recognition. In practice, the contrasts of the gray stages of the control marking 2 on the printing plate 5 are sufficient for permitting differentiation of the polygons of the high-resolution defined halftone value 23 from the background of the noninfluenceable reference tonal values 22. The high-resolution defined halftone values 23 are shown in FIG. 3 as rhombic or diamond-shaped polygons having rectangular steps, due to which they can be delimited more sharply from the surrounding noninfluenceable reference tonal values 22. The special geometric shape of the high-resolution defined halftone values 23 makes visual assessment by the operating personnel considerably easier and also makes slight discrepancies visible in the narrow tolerance range.

Additionally, the high-resolution control marking 2 also has a measurement field 24 for measuring by a densitometer. Here, the measurement field 24 includes a fixedly defined grid area of the 50% tonal value and has, in the interior thereof, a circular spot of a 100% full tone 25. The full tone area 25 serves for density equalization of a densitometer.

Figure 4:
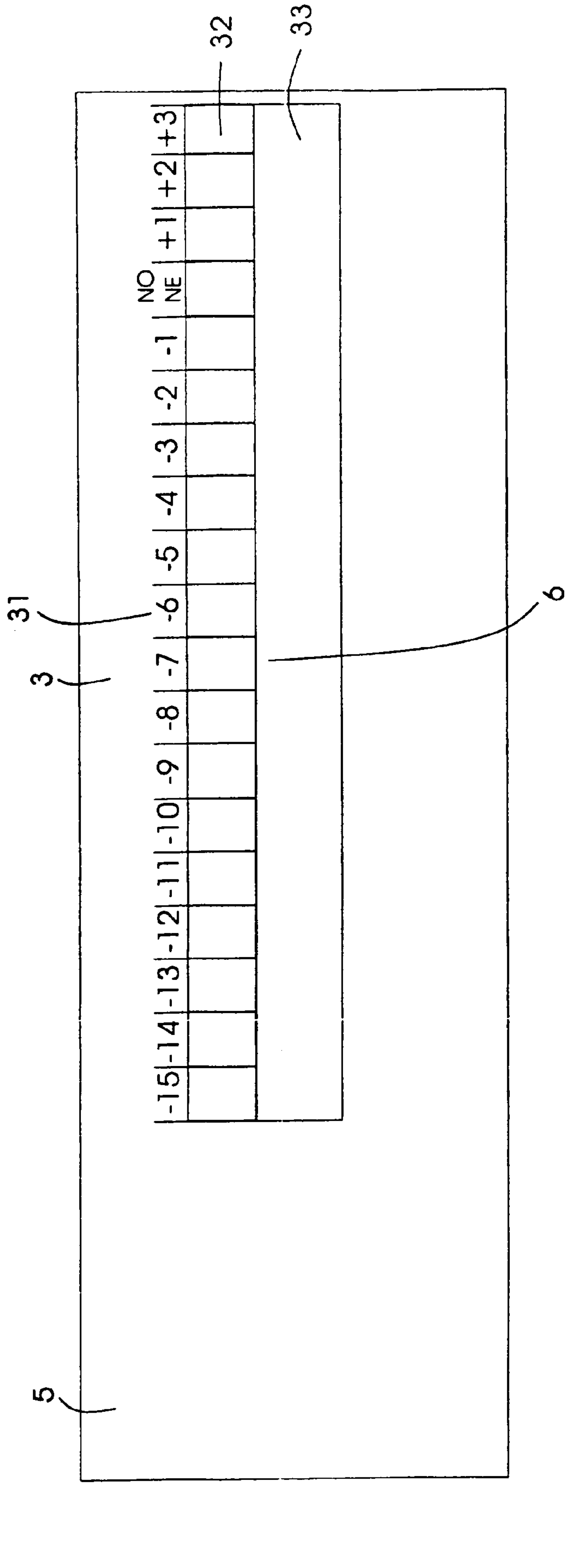
FIG. 4 is a diagrammatic view of the control device for assessing or evaluating the process calibration of a given halftone value.

By the control marking for checking the calibration according to FIG. 4, differences between uncalibrated tonal values 32 and a defined halftone value 33, which are produced by the calibration, are detectable. The region for a 50% halftone value is depicted in FIG. 4, the uncalibrated tonal values 32 being shown in an elongated strip which increases from the left-hand to the right-hand side of the figure, and the defined halftone value 33 being depicted constantly in a strip extending parallel to the elongated strip. The tonal value profile 32 extends stepwise, in this regard, for example in 1% steps increasing from the left-hand to the right-hand side, so that even very small differences are detectable. A tonal value scale 31 with depicted percentage values in the range from minus 15% to plus 3% runs parallel to the strips 32, 33. In this regard, the point of intersection at which a gray stage of the uncalibrated tonal values 32 and the defined halftone value 33 are identical is to be sought after. If this point of intersection lies at zero (none), there is no difference in the defined halftone value 33, i.e., the defined halftone value 33 is uncalibrated. If, however, the point of intersection lies, for example, at minus 7, this denotes a downward reduction of 7%, i.e, the defined tonal value 33 has been reduced from 50% to 43% at the prepress stage during process calibration. If the reduction of 7% was intended and set, the manufacturing process is in order to this extent. If, however, a different reduction or even an increase was intended, the manufacturing process has to be checked.

In this regard, however, it should be taken into account that even if the point of intersection 6 with the tonal value equality lies at zero, this does not mean that no characteristic curve has been used for all the halftone values. A characteristic curve could namely also have been used which has no change exactly at the 50% halftone value. This can be checked, however, by referring to the control markings 1 or 4 which show all the tonal values from 1 to 100%. A very exact visual check or control by the printing personnel is possible, however, for the important 50%-halftone value by the aid of the 50% control marking 3. Before the printing plate 5 is installed in a printing press, incorrectly exposed printing plates 5 can thus be removed prior to printing, and unnecessary waste therefore avoided. It is likewise true for FIG. 4 that the black borders of the tonal values 32, 33 for clarification are not present in practice. They are depicted in the drawing only for the purpose of better recognition. Here too, the contrasts of the gray stages of the control marking 3 on the printing plate 5 are sufficient in practice for it to be possible to assess the defined halftone value 33 with regard to the uncalibrated tonal values 32.

This application claims the priority, under 35 U.S.C. § 119, of German patent application No. 10 2004 013 290.9, filed Mar. 18, 2004; the entire disclosure of the prior application is herewith incorporated by reference.

I claim:

1. A visual control device on an exposed printing plate for a printing press, the visual control device comprising:

at least one control marking provided on the printing plate, said control marking being applied thereto during exposure of the printing plate, the control marking containing:

at least two strips extending at least approximately in parallel, one of said strips exhibiting an uncalibrated tonal value profile around a defined halftone value, and another of said strips exhibiting a defined halftone value calibrated in the printing process; and said at least one control marking having displayed thereon at least a region wherein said uncalibrated tonal value profile and said calibrated defined halftone value coincide visually in terms of color.

2. The visual control device according to claim 1, wherein tonal values of said uncalibrated tonal value profile stepwise increase and decrease, respectively.

3. The visual control device according to claim 1, wherein said defined halftone value is a 50% tonal value.

4. The visual control device according to claim 1, further comprising a display scale with associated percentage values provided on said control marking parallel to said two strips.

5. The visual control device according to claim 4, wherein said display scale extends from minus 15% to plus 3%.

6. A visual control device on an exposed printing plate for a printing press, the visual control device comprising:

at least one control marking provided on the printing plate, said control marking being applied thereon during exposure of the printing plate, said control marking containing:

at least a first elongated strip having an entire tonal value profile applied thereto as reference values;

at least a second elongated strip having an entire calibrated tonal value profile applied thereto, said second strip extending at least approximately parallel to said first strip; and at least a third elongated strip having a linearized tonal value profile applied thereto, said third strip extending at least approximately parallel to said parallel first and second strips.

7. The visual control device according to claim 6, further comprising a tonal value scale applied parallel to said first to third elongated strips.

8. A printing plate having thereon at least one visual control device, the control device comprising:

at least one control marking provided on the printing plate, said control marking being applied thereto during exposure of the printing plate, said control marking containing:

at least two strips extending at least approximately in parallel, one of said strips exhibiting an uncalibrated tonal value profile around a defined halftone value, and another of said strips exhibiting a defined halftone value calibrated in the printing process;

said at least one control marking having displayed thereon at least a region wherein said uncalibrated tonal value profile and said calibrated defined halftone value coincide visually in terms of color.

9. An exposed printing plate having thereon at least one visual control device, the visual control device comprising:

at least one control marking provided on the printing plate, said control marking being applied thereon during exposure of the printing plate, said control marking containing:

at least a first elongated strip having an entire tonal value profile applied thereto as reference values;

at least a second elongated strip having an entire calibrated tonal value profile applied thereto, said second strip extending at least approximately parallel to said first strip; and at least a third elongated strip having a linearized tonal value profile applied thereto, said third strip extending at least approximately parallel to said parallel first and second strips.

10. An exposed printing plate, comprising:

at least two different control devices selected from the group consisting of:

a first control device containing at least one first control marking provided on the printing plate, said first control marking being applied thereto during exposure of the printing plate, said first control marking containing:

at least two strips extending at least approximately in parallel, one of said strips exhibiting an uncalibrated tonal value profile around a defined halftone value, and another of said strips exhibiting a defined halftone value calibrated in the printing process; and said at least one first control marking having displayed thereon at least a region wherein said uncalibrated tonal value profile and said calibrated defined halftone value coincide visually in terms of color;

a second control device containing at least one second control marking on the printing plate, said second control marking being applied during exposure of the printing plate, said second control marking containing:

reference tonal values non-influencable by the printing process stepwise increasing and decreasing, respectively, in an elongated strip;

a defined halftone value being depicted repeatedly in high resolution within the same strip; and said defined halftone value being delimited within the same strip, respectively, by polygons; and a third control device containing at least one third control marking provided on the printing plate, said third control marking being applied thereon during exposure of the printing plate, said third control marking containing:

at least a first elongated strip having an entire tonal value profile applied thereto as reference values; at least a second elongated strip having an entire calibrated tonal value profile applied thereto, said second strip extending at least approximately parallel to said first strip; and at least a third elongated strip having a linearized tonal value profile applied thereto, said third strip extending at least approximately parallel to said parallel first and second strips.

* * * * *